July 6, 1937.  W. C. ANDREWS  2,086,111
RIFLING APPARATUS AND PROCESS
Filed March 6, 1936
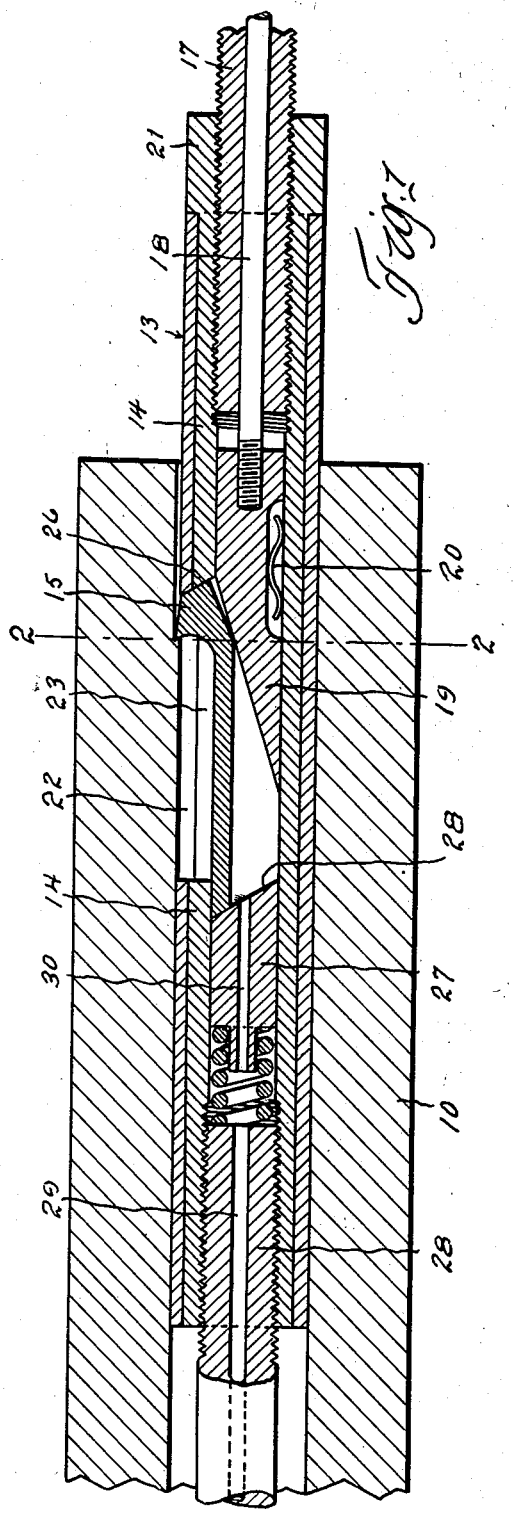
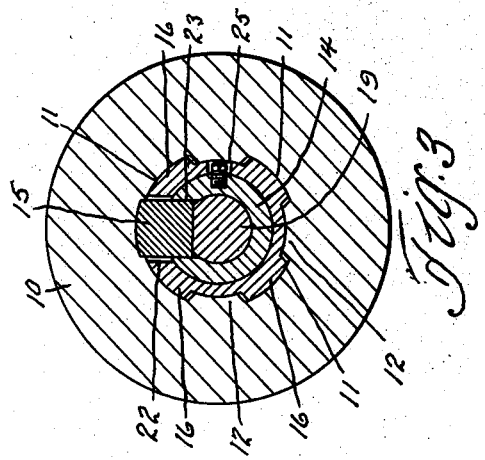
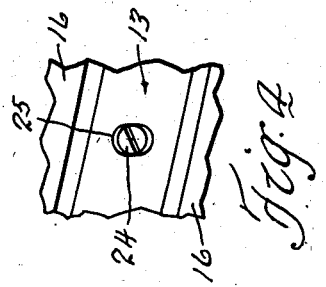
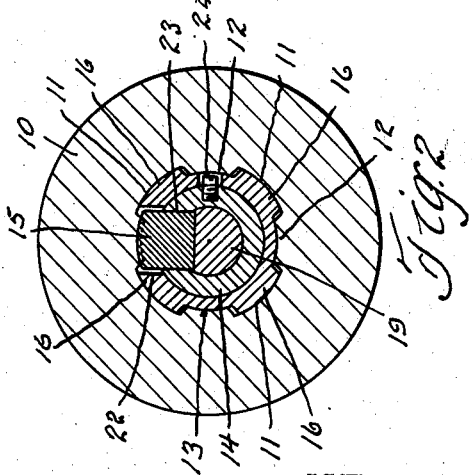
INVENTOR.
W. C. Andrews
BY
ATTORNEY.

Patented July 6, 1937

2,086,111

UNITED STATES PATENT OFFICE 2,086,111

RIFLING APPARATUS AND PROCESS

William C. Andrews, Blawnox, Pa.

Application March 6, 1936, Serial No. 67,526

4 Claims. (Cl. 90—28.1)

This invention relates to rifling of gun barrels and the like and particularly to superior apparatus for this purpose.

The principal object of this invention is to provide a rifling mechanism which will overcome all tendency to binding and possible breakage due to slight inaccuracies in positioning the cutter and guide therefor with respect to spiral grooves previously produced in the barrel.

It is to be understood that the mechanism herein disclosed is intended for use in a barrel in which one series of grooves has already been produced in a manner which is common in the art.

A further object is to provide a novel relation of guide and cutter elements whereby to realize the principal object.

Other objects will be in part apparent and part pointed out hereinafter in connection with the accompanying drawing wherein Fig. 1 is a central longitudinal section taken through a rifling tool realizing the invention and shown in position in a gun barrel; Figs. 2 and 3 are sections on the line 2—2 of Fig. 1, Fig. 2 showing the cutter in the position occupied when a land has been planed to a degree short of the bottom of the previous grooves and Fig. 3 showing the position of the cutter when the land has been entirely obliterated and formed into a groove so that the bottoms of the original grooves become the lands; and Fig. 4 is an enlarged detail fragmentary elevation showing a motion limiting stop and the slot in which it works and including the spiral configuration of the ribs on the outer surface of the rifling tool.

In the drawing, the numeral 10 indicates a gun barrel which may be of any suitable size or cross section and which has been machined in the usual manner to form a series of grooves 11 defining lands 12 therebetween. The guide portion of the rifling tool consists of an outer sleeve 13, an inner sleeve 14 concentric therewith and rotatable therein together with a cutter 15 and suitable means for holding and adjusting the cutter positioning the tool and forcing the same through the barrel 10. The outer sleeve 13 is provided with spiral ribs 16 which are received in the grooves 11 of the gun barrel and bear against the bottoms of such grooves so as to afford adequate support for the cutter 15. Threaded in the inner sleeve 14 is an element 17, the outer end of which may cooperate with a machine of the usual type for rotating the tool from one groove or land to the next. Within the element 17 and co-axial therewith is a rod 18 which may also cooperate with such machine in the usual manner to advance or retract a wedge element 19 for raising or lowering the cutter 15 whereby the groove may be progressively made deeper by succeeding small cuts. The rod 18 may be slidable in the element 17 and rotatable therein for the purpose of advancing or retarding the element 19. The left hand end of the rod 18 may be threaded for engagement with the wedge 19 so that the rotation thereof will advance the same, it being understood that longitudinal motion of the rod 18 at the time of such rotation will be prevented by the machine which rotates the same. In order to resist longitudinal motion of the element 19 against the pressure exerted on the wedge face thereof by the cutter 15, a friction element 20 may be provided. Within a limited circumferential range, the sleeve 13 is rotatable with respect to the sleeve 14 and it is held against longitudinal motion toward the right with respect thereto by a collar 21 on the sleeve 14.

The sleeve 13 is provided with an opening 22 through which the cutter 15 may extend into engagement with the gun barrel 10. The sleeve 14 has a registering opening 23 for reception of the said cutter. It will be noted that the opening 22 is circumferentially larger than 23 and that the cutter 15 has a close working fit with the opening 23 while appreciable play is provided by the opening 22 between the sleeve 13 and the cutter 15. If desired, a stock 24 may be set into the sleeve 14 and extend through an elongated slot 25 permitting circumferential motion but not permitting longitudinal motion.

It will be noted that the right hand end of the cutter 15 is provided with an angular surface 26 which is adapted to engage the sleeves 13 and 14 at the right hand end of the openings 22 and 23 whereby force may be applied to the cutter to urge the same toward the left and at the same time cause it to bear on the wedge element 19. The left hand end of the cutter is engaged by a spring pressed element 27 having an angular face 28 whereby to keep the said end of the cutter elevated to engagement with the sleeve 13, 14. A draw rod 28 may be threadedly received in the sleeve 14 and be utilized for the purpose of drawing the tool through the gun barrel in cutting relation thereto. Lubrication passages 29 and 30 may be provided in the elements 28 and 27 for the purpose of supplying oil to the cutting tool at all times. Oil may also escape therefrom through the openings 22 and 23 to the space between the gun barrel and the rifling tool.

The pitch of the spiral ribs 16 may be whatever desired, for example, one turn in ten inches, and may extend in either direction according to choice. The cutting tool may be relieved at one side of its upper surface to take care of the spiral shape of the grooves 11. As shown, the spiral ribs 16 preferably are slightly narrower than the grooves 11 so that they may be readily received therein. The slight freedom of motion of the outer sleeve 13 with respect to the inner sleeve 14 will prevent binding or breaking of the equipment when the cutter 15 is slightly displaced angularly from the position it theoretically should occupy.

I may carry the cut to an extent to plane away the lands 12 entirely and produce in the final article grooves in the place thereof, which is the usual procedure or I may plane them to a depth less than that of the grooves 11 whereby the lands 12 will continue to be the lands in the finished barrel, a procedure which I consider novel in the art.

While I have shown and described the present preferred embodiment of my improved rifling tool and method of rifling, I wish it understood that I am not limited to the details of the disclosure but only in accordance with the appended claims and the prior art.

Having thus described my invention, what I claim is:—

1. A rifling tool comprising, in combination, cutter carrying means provided with a laterally extending opening for reception of a cutter and of a size to receive the same snugly, a sleeve surrounding said cutter carrying means and freely rotatable thereon to a limited extent and having a laterally extending opening through which said cutter extends, said laterally extending opening having a greater circumferential dimension than said cutter whereby said sleeve may rotate slightly with respect to said cutter, said sleeve having spiral ribs thereon.

2. A rifling tool comprising in combination, cutter carrying means provided with a laterally extending opening for reception of a cutter and of a size to receive the same snugly, a sleeve surrounding said cutter carrying means and freely rotatable thereon to a limited extent and having a laterally extending opening through which said cutter extends, said laterally extending opening having a greater circumferential dimension than said cutter whereby said sleeve may rotate slightly with respect to said cutter, said sleeve having spiral ribs thereon, said spiral ribs being narrower than the grooves into which they are to be received.

3. A rifling tool comprising, in combination, an inner sleeve, a laterally extending opening therethrough, an outer sleeve coaxial therewith and rotatable therein and having a laterally extending opening registering with said first mentioned laterally extending opening, a cutter having a close working fit in the opening in the first sleeve, said second mentioned opening having a circumferential dimension larger than that of said cutter, said cutter extending through said second mentioned opening, an adjustable wedge in said first sleeve adapted to adjustably support said cutter, spring means urging said cutter against the rear edge of the opening in at least one of said sleeves, spiral ribs on the outer sleeve, and means for moving said sleeves and said cutter through a barrel being rifled.

4. A rifling tool comprising, in combination, an inner sleeve, a laterally extending opening therethrough, an outer sleeve coaxial therewith and rotatable therein and having a laterally extending opening registering with said first mentioned laterally extending opening, a cutter having a close working fit in the opening in the first sleeve, said second mentioned opening having a circumferential dimension larger than that of said cutter, said cutter extending through said second mentioned opening, an adjustable wedge in said first sleeve adapted to adjustably support said cutter, spring means urging said cutter against the rear edge of the opening in at least one of said sleeves, spiral ribs on the outer sleeve, and means for moving said sleeves and said cutter through a barrel being rifled, said spiral ribs being narrower than the grooves into which they are to be received.

WILLIAM C. ANDREWS.